United States Patent
Larsson et al.

(10) Patent No.: US 12,414,062 B2
(45) Date of Patent: Sep. 9, 2025

(54) USER EQUIPMENT CAPABILITIES FOR TIME SENSITIVE NETWORKING

(71) Applicant: Telefonaktiebolaget LM Ericsson (PUBL), Stockholm (SE)

(72) Inventors: Magnus Larsson, Sollentuna (SE); Bikramjit Singh, Raasepori (FI); John Walter Diachina, Garner, NC (US); Magnus Sandgren, Staffanstorp (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/914,820

(22) PCT Filed: Mar. 26, 2021

(86) PCT No.: PCT/EP2021/057937
§ 371 (c)(1),
(2) Date: Sep. 27, 2022

(87) PCT Pub. No.: WO2021/198070
PCT Pub. Date: Oct. 7, 2021

(65) Prior Publication Data
US 2023/0134036 A1    May 4, 2023

Related U.S. Application Data

(60) Provisional application No. 63/002,600, filed on Mar. 31, 2020.

(51) Int. Cl.
*H04W 56/00* (2009.01)
(52) U.S. Cl.
CPC ... *H04W 56/0015* (2013.01); *H04W 56/0045* (2013.01); *H04W 56/0055* (2013.01)

(58) Field of Classification Search
None
See application file for complete search history.

(56) References Cited

U.S. PATENT DOCUMENTS

2019/0306817 A1* 10/2019 Abedini ............ H04W 56/005
2020/0351814 A1* 11/2020 Manolakos ....... H04W 56/0065
(Continued)

FOREIGN PATENT DOCUMENTS

WO    2018 031704 A1    2/2018
WO    2020 031113 A1    2/2020
(Continued)

OTHER PUBLICATIONS

3GPP TS 22.104 v17.2.0; Technical Specification; 3rd Generation Partnership Project; Technical Specification Group Services and System Aspects; Service requirements for cyber-physical control applications in vertical domains; Stage 1 (Release 17)—Dec. 2019.
(Continued)

*Primary Examiner* — Saad Khawar
(74) *Attorney, Agent, or Firm* — Baker Botts L.L.P.

(57) ABSTRACT

According to some embodiments, a method performed by a wireless device capable of operating in a time sensitive network (TSN) comprises obtaining a time synchronization capability of the wireless device and transmitting an indication of the time synchronization capability to a network node. In particular embodiments, the time synchronization capability comprises one or more of a downlink receive tracking accuracy supported by the wireless device, a receive to transmit relative timing accuracy supported by the wireless device, an internal timing accuracy supported by the wireless device, and a propagation delay (PD) compensation method selection capability supported by the wireless device.

14 Claims, 15 Drawing Sheets

(56) References Cited

U.S. PATENT DOCUMENTS

| | | | | |
|---|---|---|---|---|
| 2022/0039045 A1* | 2/2022 | Sun | ................... | H04W 56/0015 |
| 2022/0264410 A1* | 8/2022 | Yao | ..................... | H04W 36/185 |
| 2023/0098329 A1* | 3/2023 | Yuan | ....................... | H04W 8/24 |
| | | | | 370/329 |

FOREIGN PATENT DOCUMENTS

| | | | |
|---|---|---|---|
| WO | 2020 167013 A1 | 8/2020 | |
| WO | 2020 183014 A1 | 9/2020 | |
| WO | 2021 066730 A1 | 4/2021 | |
| WO | 2021 066732 A1 | 4/2021 | |
| WO | 2021 181363 A1 | 9/2021 | |

OTHER PUBLICATIONS

3GPP TS 38.133 v16.2.0; Technical Specification; 3rd Generation Partnership Project; Technical Specification Group Radio Access Network; NR; Requirements for support of radio resource management (Release 16)—Dec. 2019.

3GPP TSG RAN WG1 Ad-Hoc Meeting 1901; Taipei, Taiwan; Source: Intel Corporation; Title: TSN evaluations for IIoT requirements (R1-1900500)—Jan. 21-25, 2019.

3GPP TSG RAN WG1 Meeting #98bis; Chongqing, China; Source: Nokia, Nokia Shanghai Bell; Title: IIoT WI: Resource conflicts between UL grants, HARQ-ACK Enhancements for SPS and TSN time Synchronization (R1-1910870)—Oct. 14-20, 2019.

PCT International Search Report issued for International application No. PCT/EP2021/057937—Jun. 28, 2021.

PCT Written Opinion of the International Searching Authority issued for International application No. PCT/EP2021/057937—Jun. 28, 2021.

* cited by examiner

USER EQUIPMENT CAPABILITIES FOR TIME SENSITIVE NETWORKING

PRIORITY

This nonprovisional application is a U.S. National Stage Filing under 35 U.S.C. § 371 of International Patent Application Serial No. PCT/EP2021/057937 filed Mar. 26, 2021 and entitled "USER EQUIPMENT CAPABILITIES FOR TIME SENSITIVE NETWORKING" which claims priority to U.S. Provisional Patent Application No. 63/002,600 filed Mar. 31, 2020 both of which are hereby incorporated by reference in their entirety.

TECHNICAL FIELD

Particular embodiments relate to wireless communication, and more specifically to user equipment (UE) capabilities for time sensitive networking (TSN).

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Third Generation Partnership Project (3GPP) fifth generation (5G) new radio (NR) supports time sensitive networking (TSN), such as 5G integrated in Ethernet-based industrial communication networks like factory automation networking and related areas.

Problems of clock inaccuracy/uncertainty are inherent to methods for relaying an internal 5G system clock from a source node in the 5G system to user equipment (UEs) supporting industrial Internet-of-things (IIoT) end devices. One inaccuracy of concern is the error introduced as a result of the radio frequency (RF) propagation delay (PD) that occurs when a gNB transmits a 5G system clock over the radio interface within a message (e.g., system information block (SIB) or radio resource control (RRC) unicast based) wherein the propagation delay needs to be compensated to ensure the clock value received by the UE is as close as possible to the value of that clock in the corresponding source node (e.g., a gNB with knowledge of the 5G internal system clock). In other words, the better the accuracy of relaying the 5G system clock from the source node to the UE the better the accuracy that will be realized when external TSN clocks are relayed from a TSN grandmaster (GM) node through the 5G system to UEs (and subsequently to end-stations).

FIG. 1 is a block diagram illustrating ingress and egress timestamping for TSN GM clock. Ingress timestamping is performed when an external TSN clock is received by a 5G system and egress timestamping is performed when that TSN clock (relayed through the 5G system) arrives at a UE. Because the TSN GM clock can have an arbitrary placement, the ingress time stamping can be performed at various places within the 5GS system, e.g., at the user plane function (UPF) network side TSN translator (NW-TT) or at the UE device-side TSN translator (DS-TT).

The difference between the two timestamps is a reflection of the 5G residence time which is used to adjust the value of the external TSN GM clock received by a UE. Due to this, the relative accuracy of the 5G residence time measured between ingress and egress point is essential for accurate TSN GM clock timing information delivered over 5G networks.

The timestamping is based on the internal 5G system clock and the accuracy of delivering this clock to a UE is improved by allowing it to be adjusted to more precisely reflect the propagation delay experienced when the UE receives it from a gNB. Internal errors within the UE and errors within the 5G network also contribute to errors affecting the accuracy of the 5G system clock delivered to a UE.

An additional source of inaccuracy occurs as a result of subsequent UE distribution of the clock to IIoT end devices which is needed to enable TSN functionalities, e.g., time-aware scheduling of IIoT device operations specific to the working domain (a specific factory area) associated with a given working clock (i.e., a TSN GM clock). There are different methods, such as legacy timing advance (TA), that a UE can use to estimate and compensate for delay propagation.

The 3GPP timing advance (TA) command (see 3GPP TS 38.133) is used in cellular communication for uplink transmission synchronization. It is further classified as two types. At connection setup, an absolute timing parameter is communicated to a UE using a medium access control (MAC) random access response (RAR) element. After connection setup, a relative timing correction can be sent to a UE using a MAC control element (CE) (e.g., UEs can move or the timing advance may change based on radio frequency (RF) channel changes caused by the environment).

The downlink propagation delay can be estimated for a given UE by (a) first summing the TA value indicated by the RAR (random access response) and all subsequent TA values sent using the MAC CE and (b) taking some portion of the total TA value resulting from summation of all the TA values (e.g., 50% could be used assuming the downlink and uplink propagation delays are essentially the same). The estimated PD can then be used to understand time synchronization dynamics, e.g., for accurately tracking (compensating) the value of a 5G system clock at the UE side relative to the value of that clock in some other network node.

Possible methods used for determining a value for the downlink propagation delay applicable to a UE (used for compensating the value of the 5G system clock received by the UE) include the following four methods.

In Method 1, no compensation is needed. In this case the expected distance between the gNB antenna and the UE is small enough (e.g., <30 m) to make the applicable downlink PD either negligible or not worth trying to measure given the uncertainty errors for the 5G system clock that could be introduced thereby. In this case the inaccuracies for 5G system clock distribution related to the air interface will be dominated by the UE downlink receive timing tracking.

Internal UE errors and network related errors will also contribute to total 5G system clock errors in this case as is true for all methods mentioned below.

Method 2 uses pre-compensation. In this case the distance between the gNB antenna and the UEs within a cell is small enough to enable the gNB to consider an average distance of UEs from the gNB antenna as being sufficiently accurate regarding the worst case uncertainty it will introduce for the 5G system clock, e.g., assuming an average distance of 30 m in an operational cell radius of 60 m will result in a maximum of 100 ns of error being introduced for the downlink PD. Also, here inaccuracies related to UE downlink receive timing tracking will contribute together with residual PD errors to air interface inaccuracies affecting the accuracy of the 5G system clock.

Method 3 uses a legacy 3GPP timing advance command. In this case the legacy 3GPP TA command is used in cellular communication for uplink transmission synchronization. It is further classified as two types, as described above.

The downlink propagation delay can be estimated for a given UE by (a) first summing the TA value indicated by the RAR (random access response) and all subsequent TA values sent using the MAC CE control element and (b) taking some portion of the total TA value resulting from summation of all the TA values (e.g., 50% could be used assuming the downlink and uplink propagation delays are essentially the same). This is a round trip time (RTT) based method and when used is seen as introducing ~500 ns of uncertainty when adjusting the 5G system clock to take into account the downlink PD assuming 15 kHz subcarrier spacing (SCS), and it scales down for higher numerologies according to existing 3GPP specifications (however larger cells where propagation delays really can be substantial operate at lower SCS and then PD compensation using Method 3 can only achieve approximately 500 ns of uncertainty, as described above).

As for all RTT based methods, relative inaccuracies between RX-TX could significantly contribute to inaccuracies in PD determination.

Method 4 includes enhanced RTT determination. In this case an enhanced method for determining the RTT (and therefore an improved accuracy for estimating the downlink PD) is used to substantially reduce the uncertainty of the estimated downlink PD from the 500 ns value associated with legacy Method 3. If a high level of accuracy is needed for the 5G system clock, then this enhanced method could involve improving the accuracy with which UEs track downlink transmissions from a gNB.

One set of information for optimal PD compensation method selection relates to UE capabilities. If this information is signaled and made available to the gNB, the gNB can make better decisions and thereby improve UE 5G system clock accuracy and thereby TSN end-to end clock accuracy compared to the case when this information is not known to the gNB.

As per Method 3, relative inaccuracies between RX-TX could significantly contribute to inaccuracies in PD determination.

There currently exist certain challenges. For example, current procedures for sending a 5G system clock from a gNB to a UE include SIB broadcasting wherein a specific SIB message includes a value for the 5G system clock having a value that is relative to a specific point in the system frame number (SFN) structure (e.g., the end of the most recent SFN used for sending system information). The procedures also include RRC unicast wherein a dedicated RRC message is used to send a specific UE a value for the 5G system clock having a value that is relative to a specific point in the SFN structure (e.g., end of SFNx).

Because the definitions of the 5G system clock above relates to when the SFN reference point occurs at the gNB antenna, individual compensation for RF air propagation delay (PD) between gNB and the UE will be needed for the UE to accurately compensate and derive a correct and aligned 5G system clock time at the UE.

There are different methods that can be used to estimate and compensate for downlink delay propagation. In practice one method might be best during certain conditions and towards a specific UE while another one might be best for another UE even if served by same gNB. How to best select an appropriate method both for fulfilling TSN GM clock end to end timing accuracy requirements and minimizing signaling overhead among a multitude of possible methods for providing downlink PD information is based on a gNB taking into account a multitude of input parameters, some of the input parameters relate to specific UE capabilities today lacking in 3GPP for this new use case.

In addition, because internal UE related errors contribute to total 5G system clock errors and thereby total TSN GM clock timing errors, information about this source of errors is significant information for decision making related to the accuracy of 5G system clock distribution. Information about UE internal errors affecting the accuracy level for TSN GM clock related services is lacking in 3GPP today.

SUMMARY

Based on the description above, certain challenges currently exist with user equipment (UE) capabilities for time sensitive networking (TSN). Certain aspects of the present disclosure and their embodiments may provide solutions to these or other challenges. For example, different TSN applications may require different levels of TSN grand master (GM) clock end-to-end accuracies and because different UEs may have different capabilities for accurate timing performance, new UE capability information may be used to indicate various capability levels.

For example, UE Capability 1 includes UE downlink receive tracking accuracy: An indication of UE 5GS downlink receive tracking accuracies is supported where accuracies relate to timing reference signal characteristics including bandwidth and SNR conditions.

UE Capability 2 includes UE receive to transmit relative timing accuracy: An indication of UE relative receive to transmit timing accuracy is supported where accuracies relate to timing reference signal characteristics including bandwidth and SNR conditions.

UE Capability 3 includes UE internal timing accuracy: Particular embodiments include an indication of internal UE accuracy level.

UE Capability 4 includes propagation delay (PD) compensation selection capability. For example, particular embodiments include informing the gNB whether the UE supports an enhanced round trip time (RTT) based delay compensation capability or what kind of PD based delay compensation capability the UE supports.

In particular embodiments, the network node uses the UE capability information for the following operations. For example, the network node may estimate the 5G system clock accuracy that can be realized for a specific UE and thereby help estimate, with different methods used, whether a given UE can support the end-to end accuracy (uncertainty) requirements for any given TSN GM clock distribution (i.e., uncertainty contributions from network elements external to a 5GS system need to be added to the uncertainty injected by the 5GS to thereby identify a total end-to-end uncertainty that can be realized; 3GPP TS 22.104 specifies and defines 5GS budgets towards different use cases as a fraction of end-to-end requirements).

The network node may determine the most appropriate method for determining a value for downlink PD to be used for compensating a 5G system clock. The network node may determine the most appropriate method for distributing 5G system clock information, such as SIB broadcast or RRC unicast, where the latter includes an improved UE 5G system downlink receive tracking capability.

According to some embodiments, a method performed by a wireless device capable of operating in a TSN comprises obtaining a time synchronization capability of the wireless device and transmitting an indication of the time synchronization capability to a network node.

In particular embodiments, the time synchronization capability comprises one or more of a downlink receive tracking accuracy supported by the wireless device, a receive to transmit relative timing accuracy supported by the wireless device, an internal timing accuracy supported by the wireless device, and a PD compensation method selection capability supported by the wireless device. The PD compensation method selection capability may comprise a capability to select between any one or more of a pre-compensation PD based method, a timing advance command based method, and an enhanced RTT based method.

In particular embodiments, the time synchronization capability comprises an indication of whether the wireless device can receive 5G system clock information via one or more of a broadcast and a unicast based method.

In particular embodiments, the time synchronization capability further comprises an indication of a maximum bound of accuracy error associated with a time synchronization capability.

In particular embodiments, transmitting the indication of the time synchronization capability to the network node comprises transmitting a RRC UE Capability Information message either in response to a request from the network node or periodically.

According to some embodiments, a wireless device is capable of operating in a TSN. The wireless device comprises processing circuitry operable to perform any of the methods of the network node described above.

According to some embodiments, a method performed by a network node capable of operating in a TSN comprises receiving an indication of a time synchronization capability of a wireless device and determining a synchronization parameter for the wireless device based on the received indication of the time synchronization capability.

In particular embodiments, the time synchronization capability comprises one or more of a downlink receive tracking accuracy supported by the wireless device, a receive to transmit relative timing accuracy supported by the wireless device, an internal timing accuracy supported by the wireless device, and a PD compensation method selection capability supported by the wireless device. The PD compensation method selection capability may comprise a capability to select between any one or more of a pre-compensation PD based method, a timing advance command based method, and an enhanced RTT based method.

In particular embodiments, determining the synchronization parameter comprises determining a PD compensation method to use based on the received synchronization capability. Determining the synchronization parameter may comprise determining a PD compensation method is not needed.

In particular embodiments, the time synchronization capability comprises an indication of whether the wireless device can receive 5G system clock information via one or more of a broadcast and a unicast based method.

In particular embodiments, the time synchronization capability further comprises an indication of a maximum bound of accuracy error associated with a time synchronization capability.

In particular embodiments, determining the synchronization parameter for the wireless device is based on a number of wireless devices in a 5G system clock distribution path.

In particular embodiments, the method further comprises receiving an indication of a time synchronization capability of a second wireless device from the second wireless device or another network node.

According to some embodiments, a network node is capable of operating in a TSN. The network node comprises processing circuitry operable to perform any of the network node methods described above.

Also disclosed is a computer program product comprising a non-transitory computer readable medium storing computer readable program code, the computer readable program code operable, when executed by processing circuitry to perform any of the methods performed by the wireless device described above.

Another computer program product comprises a non-transitory computer readable medium storing computer readable program code, the computer readable program code operable, when executed by processing circuitry to perform any of the methods performed by the network node described above.

Certain embodiments may provide one or more of the following technical advantages. For example, the network node may estimate the accuracy of the 5G system clock distribution from the gNB antenna to the UE DS-TT. When estimating the total uncertainty introduced by a 5G system (i.e., the 5GS portion of the end-to-end uncertainty budget with relations to specified allowed budget uncertainties) the following factors may be considered.

For example, some embodiments consider the location of the TSN GM clock, i.e., at an end station reachable through a UE (TSN GM clock ingress is at a UE DS-TT and egress is at another UE DS-TT, as illustrated in FIG. 2) or at a TSN node external to the 5GS (TSN GM clock ingress is at the UPF NW-TT and egress is at a UE DS-TT, as in FIG. 1).

Based on the location of the TSN GM clock, the estimated uncertainty contribution from the 5G system may vary. If a TSN GM clock is located at an end station reachable through a UE, there are two instances of uncertainty resulting from delivering the 5G system clock from a gNB antenna to a UE DS-TT and, assuming each UE is served by a different gNB, two instances of uncertainty resulting from delivering the 5G system clock to two different gNB antennas, as shown in FIG. 2 (this case can also be served within same gNB).

Otherwise, if TSN GM clock is located at a TSN node external to the 5GS, there is one instance of uncertainty resulting from delivering the 5G system clock from a gNB antenna to a UE DS-TT and one instance of uncertainty resulting from delivering the 5G system clock to the gNB antenna and the user plane function (UPF) NW-TT (i.e., assuming the 5GS serves to distribute the 5G system clock it receives, e.g., from a global positioning system (GPS) receiver to both the ingress and egress points) as in FIG. 1.

The deployment option of the TSN GM clock may be known by, e.g., a CNC (Centralized Network Controller) of a TSN. A CNC knows which end stations require which TSN GM clocks and thus knows whether any given end station requires reception of a TSN GM clock or serves as the source of a TSN GM clock.

A CNC may also know the uncertainty requirement associated with any given TSN GM clock and, along with its knowledge of whether an end station serves as the source of that TSN GM clock, can provide a 5GS with an indication of the uncertainty budget to be satisfied by the 5GS portion of the end-to-end path, thereby allowing a gNB to determine the best method for delivering the 5G system clock to the UEs requiring that TSN GM clock.

For example, when a TSN GM clock is located at an end station reachable through a UE, as in FIG. 2, the 5GS can be informed that a more demanding 5GS uncertainty budget applies (compared to the case where the TSN GM clock is in the TSN network, as shown in FIG. 1). This knowledge is conveyed to a gNB thereby triggering it to select a more accurate method for delivering the 5G system clock to UEs requiring that TSN GM clock (i.e., for this example there are a greater number of components of uncertainty comprising the 5GS portion of the end-to-end uncertainty budget and therefore using a more accurate method for 5G system clock delivery may be needed to satisfy the 5GS portion of the end-to-end uncertainty budget). It is also an indication that a UE that supports further distribution of a TSN GM clock received from a TSN end device will need a more accurate 5G system clock.

The estimated relative accuracies introduced by the 5G system depends on 5G system clock distribution and products used in the network and can be derived from product data (e.g., pre-characterization) and deployment information.

Because 5GS uncertainty budget allocation is specified as part of total TSN GM clock end-to-end uncertainty budget, using estimates of the 5GS uncertainty budget the 5GS could estimate accuracy levels that can be realized for end-to-end paths involving specific UEs and thereby better assess the best methods to use for realizing the required TSN GM clock accuracies.

In particular embodiments, the UE capabilities described herein facilitate a 5G network to better perform the following functions for supporting TSN GM clock timing related services. For example, the network may estimate the 5G system clock accuracy that is to be realized for a specific UE. Based on the required 5G system clock accuracy and estimated 5G system clock accuracies, the network may decide the most appropriate PD method for providing a UE with information to determine the downlink RF delay compensation to be applied to a 5G system clock.

Based on the required 5G system clock accuracy and estimated 5G system accuracies, the network may decide the most appropriate method for distributing 5G system clock information such as SIB broadcast or RRC unicast, where the latter potentially may involve introducing an improved UE 5G system downlink RX tracking capability. The network may differentiate between UEs involved in supporting TSN GM clock related services and avoid mandating new requirements to regular UEs that do not support such capabilities.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

As described above, certain challenges currently exist with user equipment (UE) capabilities for time sensitive networking (TSN). Certain aspects of the present disclosure and their embodiments may provide solutions to these or other challenges. For example, in some embodiments a UE may signal its time synchronization capabilities to a network node. The network node may determine the most appropriate method for determining a value for downlink propagation delay (PD) for compensating a fifth generation (5G) system clock sent to a UE. The network node may determine the most appropriate method for distributing 5G system clock information, such as system information base (SIB) broadcast or radio resource control (RRC) unicast, where the latter include an improved UE 5G system downlink receive tracking capability.

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

In some embodiments, the RRC message sent to provide UE capability information can indicate information for each UE capability in the form of binary state—where one state indicates that TSN related UE capability is supported and other state pertains to negative support for the TSN related UE capability. The signaling of synchronization accuracy that a UE supports can be done in a UE Capability Information message. An example is illustrated in FIG. 3.

Figure 3:
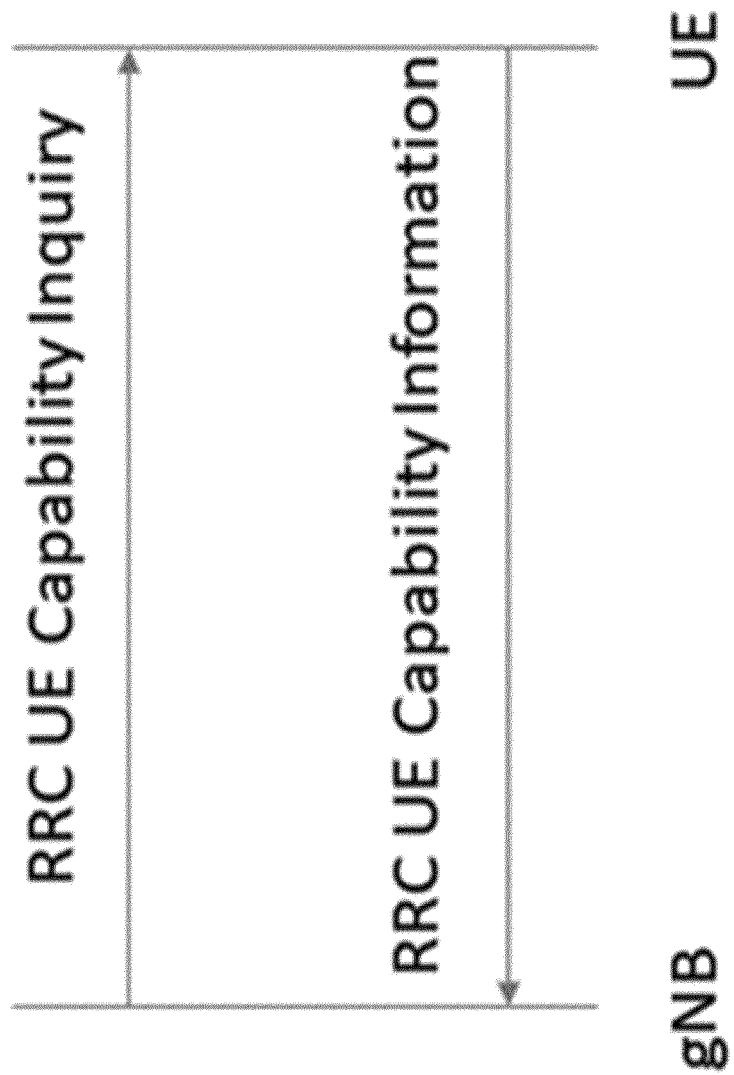
FIG. 3 is sequence diagram illustrating example radio resource control (RRC) signaling for UE capability determination.

FIG. 3 is a sequence diagram illustrating example RRC signaling for UE capability determination. The gNB may request TSN capability information by sending a RRC UE Capability Inquiry to the UE. The UE may provide the TSN capability information in a RRC UE Capability Information response. In some embodiments the UE may report its TSN capabilities autonomously (i.e., no inquiry needed). In some embodiments, instead of sending a UE specific RRC or downlink control information (DCI) UE inquiry message, a gNB can send a broadcast message (RRC or DCI based) to the UEs to request that they report their respective UE capabilities (e.g., at least those capabilities that allow for the gNB to enable TSN services for a UE).

Some embodiments include UE downlink RX timing tracking accuracy (also referred to herein as UE Capability 1). Different TSN applications may use different levels of TSN GM clock end-to-end accuracies and because different UEs may have different capabilities for accurate downlink time tracking, particular embodiments include a UE providing capability information to indicate various levels of UE 5GS downlink RX tracking accuracies supported by the UE where accuracies could relate to timing reference signal characteristics including BW/SNR conditions and channel characteristics.

The reference timing may be defined as the time when the first detected path (in time) of a defined timing reference signal or frame boundary with a relation to 5GS time is received at the UE antenna input.

If, e.g., very small RF propagation delay applies (e.g., for very small cells) the UE downlink RX tracking accuracy will likely dominate the 5G system clock timing error for the air interface.

3GPP specifications do not include a specific figure for UE downlink timing tracking accuracy because it is not needed for communication scenarios that do not involve TSN—5GS interworking (downlink RX performance covered by other specifications). Regular communication scenarios generally only require timing accuracies related to fraction of CP (cyclic prefix) which can be large especially for smaller subcarrier spacings (SCS). To differentiate and only put new and potentially stricter requirements for devices involved in TSN GM clock end-to-end timing distribution, particular embodiments include a dedicated capability (to avoid mandatory strict requirements for all devices potentially causing backward compatibility issues and driving cost/complexity when not needed).

5G system clock delivery through SIB broadcasting may use the same reference signal characteristics for all UEs while RRC unicast based delivery may be flexible and adapted for various needs.

In particular embodiments, the UE RX tracking capability can, e.g., be based on a predefined table, such as example Table 1, where a UE reports the RX tracking accuracy level it supports (e.g., before the service is initiated) and based on this report and other parameters, the network selects an appropriate method for 5G system clock delivery including PD determination methods.

TABLE 1

UE RX tracking capability example table

| UE TSN RX tracking case | Conditions | Reference signal characteristics and configuration | UE TSN RX tracking accuracy level reported |
|---|---|---|---|
| 1 | BW range 1 SNR range 1 | SIB Broadcast 1 | Level 1 < X (uncertainty less than X) Y < Level 2 < X (uncertainty in range) . . . . . . |
| 2 | BW range 2 SNR range 2 | SIB Broadcast 2 | . . . |
| 3 | BW range 3 SNR range 3 | Unicast config 2 | |
| 4 | BW range 4 SNR range 4 | Unicast config 3 | |

In particular embodiments, the signaling of TSN RX tracking accuracy level that a UE supports can be done in a UE Capability Information message, as illustrated in FIG. 3.

In some embodiments, the UE reports regularly its currently estimated RX tracking accuracy level based on used 5GS timing signals and experienced channel conditions. The reporting may be made on a defined periodic basis or based on predefined trigger levels such as change in related conditions and estimated accuracy level.

The embodiments may be combined, for example, wherein a table is used initially followed by periodic reporting.

In some embodiments, the estimated UE RX tracking accuracy level can change based on which information reported in Table 1 applies (i.e., the applicable UE TSN RX tracking case) and channel conditions (e.g., SNR) reported by the UE.

Some embodiments include UE RX to TX timing accuracy (also referred to herein as UE Capability 2). In some embodiments, the UE signals (reports) a pre-defined identifier informing the gNB of various levels of UE relative RX to TX timing accuracy the UE supports, where accuracies may relate to timing reference signal characteristics including BW/SNR conditions and channel characteristics (and related to RTT based method used, e.g., legacy TA or enhanced RTT). Whether operating at time division duplex (TDD) band or frequency division duplex (FDD) band may impact accuracy levels, but reporting could be assumed related to operating band.

This timing accuracy reflects timing imprecision introduced when a UE attempts to align its uplink transmission relative to its downlink reception according to a timing offset it has been commanded to use (i.e., the UE attempts to follow the timing offset commanded by a gNB but does so imperfectly, thereby resulting in a gNB receiving a misaligned uplink transmission relative to its downlink transmissions where the assumption is that the misalignment is due to propagation delay).

Also, the same advantage as for UE Capability 1 applies with respect to avoiding a mandatory requirement to support UE Capability 2 for UEs without a dedicated need for accurate TSN end-to-end delivery. In LTE and NR, UE relative RX-TX accuracies may be specified for positioning purposes. The use cases (i.e., positioning versus TSN GM clock synchronization) are different and thereby capabilities could be different including different target accuracies.

The relative internal accuracy between RX and TX within the UE provides an understanding of the performance of a specific RTT based PD compensation method and facilitates evaluating RTT based methods against other PD methods regarding their impact on the 5GS uncertainty budget and thereby establishing their suitability for realizing the TSN end-to end accuracy (uncertainty) target.

Similar signaling methods as described above may be used to signal information, i.e., one based on reported values based on pre-defined characteristics another based on actual perceived accuracy. Reporting could be periodic or based on trigger levels, e.g., change in relevant conditions and estimated accuracy level.

TABLE 2

Example UE relative RX to TX timing accuracy table

| UE TSN RX-TX accuracy case | Conditions | Reference signal characteristics and configuration | RTT method | UE TSN RX-TX accuracy level |
|---|---|---|---|---|
| 1 | BW range 1 SNR range 1 | Config 1 | Legacy TA | Level 1 < X Y < Level 2 < X ... ... |
| 2 | BW range 2 SNR range 2 | Config 2 | Enhanced RTT | |
| 3 | BW range 3 SNR range 3 | Config 3 | Enhanced RTT | |
| 4 | BW range 4 SNR range 4 | Config 3 | Enhanced RTT | |

In particular embodiments, the signaling of TSN RX-TX accuracy level that a UE supports may be done in a UE Capability Information message, as illustrated in FIG. 3.

Some embodiments include UE internal accuracy (also referred to herein as UE Capability 3). UE internal accuracy focuses on the uncertainty introduced when relaying the 5G reference time (maintained at the UE) to a DS-TT, where it will be used for 5GS ingress or egress timestamping. Ensuring sufficiently low UE internal errors, i.e., from UE antenna to DS-TT functionality (including errors in the latter) relative to the total 5G system uncertainty budget is important. This generally requires stricter internal UE timing accuracy than regular communication services (i.e., services that do not involve TSN—5GS interworking) between central timing keeping function and antenna because regular communication services have a timing accuracy relation to the relatively large cyclic prefix.

Figure 1:
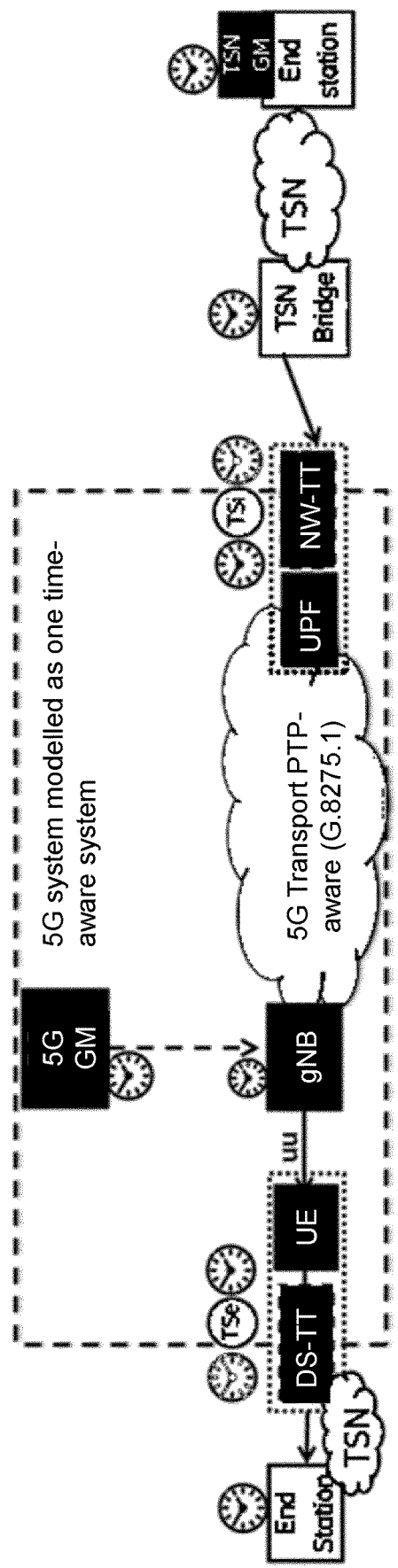
FIG. 1 is a block diagram illustrating a time sensitive networking (TSN) grand master (GM) clock located at a source node reachable through a user plane function (UPF) NW-TT resulting in a 5G system ingress at a UPF NW-TT and egress at a user equipment (UE) DS-TT.
Figure 2:
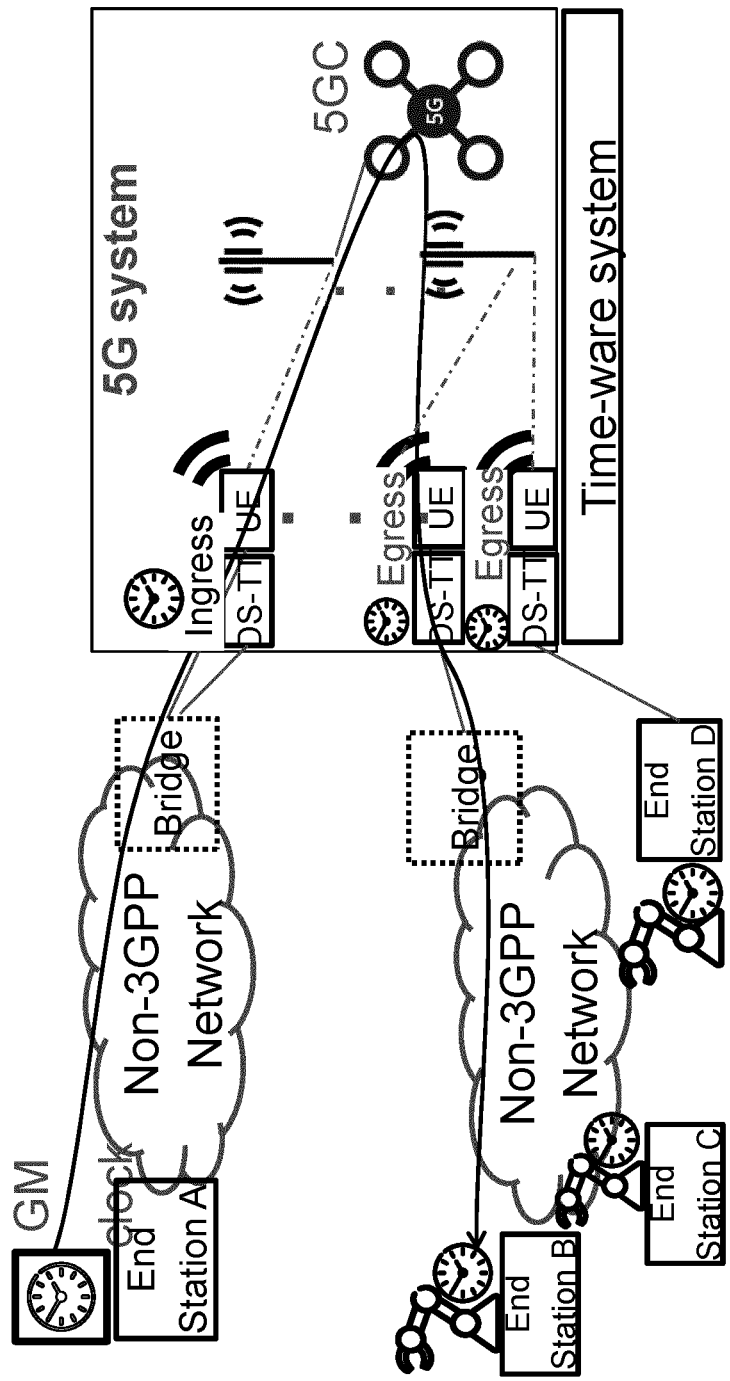
FIG. 2 is a block diagram illustrating a TSN GM clock located at source node reachable though a DS TT resulting in a 5G system ingress at a first UE DS-TT and egress at a second UE DS-TT.

This part of the budget also includes an accurate timing distribution between UE core functionality and DS-TT not required for regular communication services. 3GPP Release 17 requires support for TSN GM clock distribution use case involving two radio interfaces (i.e., an end station connected to a DS-TT serves as a TSN GM clock towards another UE/DS-TT connecting to a TSN end device, as in FIG. 2). Thus, there are two UE internal error components in the path that add to the total allowed 5GS budget. Accordingly, particular embodiments limit and bound internal UE error to meet TSN end-to-end accuracy requirements.

This timing requirement is not covered by existing specifications. To avoid mandatory requirements not needed by all UEs, particular embodiments include a UE internal error related capability for UEs part of the 5G systems and interoperating with TSN networks.

The timing requirement may be defined as a comparison between UE DS-TT perceived 5GS timing and a reference timing that is defined as the time when the first detected path (in time) of the timing reference signal or frame boundary with a relation to reference 5GS time received at the UE antenna input. Variants may include separating parts related to the air interface (RX DL timing tracking capability) and internal parts related to UE design and implementation, i.e., the total inaccuracy from the UE antenna to and including the DS-TT may be derived based on the sum of Capability 1 and Capability 3.

Particular embodiments include UE capability information to indicate various levels of uncertainty introduced when relaying 5G system clock information from the UE antenna to the DS-TT.

The signaled capability may be used by the network to take proper actions to secure meeting TSN end-to-end requirements, e.g., if the network knows a particular UE supports strict TSN end to-end accuracies, and if information indicating relatively large UE internal errors is made available to the network, an accurate method for PD compensation may be used.

The signaled capability may be used, together with other information, to estimate 5GS accuracy for the particular UE and thereby estimate the total TSN end-to-end accuracy that can be realized (the latter can be estimated if 5GS receives information about error components outside 5GS).

TABLE 3

TSN UE internal accuracy levels

| TSN UE internal accuracy levels | TSN UE internal accuracy window |
|---|---|
| 1 | Level 1 < X |
| 2 | Y < Level 2 < X |
| 3 | ... |
| 4 | ... |

In particular embodiments, the UE capability for indicating TSN UE internal accuracy can be understood as pertaining to the uncertainty bounds at the UE side including TSN end station, and this could relate to UE implementations with tightly integrated TSN end device functionality.

In particular embodiments, the signaling of the TSN UE internal accuracy level that a UE supports can be done in a UE Capability Information message, as illustrated in FIG. 3.

Some embodiments include PD compensation selection capability (also referred to herein as UE Capability 4). To minimize the total TSN GM clock uncertainty, particular embodiments estimate the downlink PD (used by a UE to adjust the received 5G system clock) is estimated with as small error as possible. A specific UE might not be able to support a complete set of networks supported PD methods (e.g., due to new standardized methods developed over time and not present at earlier 3GPP releases).

In some embodiments as input for optimal PD selection, the UE can signal a pre-defined identifier informing the gNB what PD methods it supports (see Table 4 with examples related to earlier described PD methods). The gNB can use the capability to help ensure/verify that TSN GM clock uncertainty targets can be realized for any given scenario of concern, i.e., larger cells.

TABLE 4

Example UE PD method capability

| PD method | Capability |
| --- | --- |
| Pre-compensation PD based method | Yes/No |
| Legacy 3GPP Timing Advance command based | Yes/No |
| Enhanced RTT based PD method | Yes/No |

Because the capability is needed when the UE data bearer is set up, it is beneficial if the UE capability is known when the UE enters the cell for the first time. Therefore, particular embodiments send capability information in the RRC UE Capability Information, as illustrated in FIG. 3.

Different forms to interchange level of accuracies for all mentioned capabilities requiring such information may be used, in addition to earlier mentioned.

Some embodiments include an indication of uncertainly bounds. In particular embodiments, the UE can send, e.g., a UE Capability Information message to additionally indicate the maximum bound of uncertainty (accuracy error, e.g., 500 ns or 1 us) corresponding to any given UE capability (i.e., any given component of the 5GS uncertainty budget) used for determining UE internal accuracy performance. In another form, the capability information can be provided as a bit map in the message wherein different values are associated with different bit map positions. An example is illustrated in FIG. 4.

Figure 4:
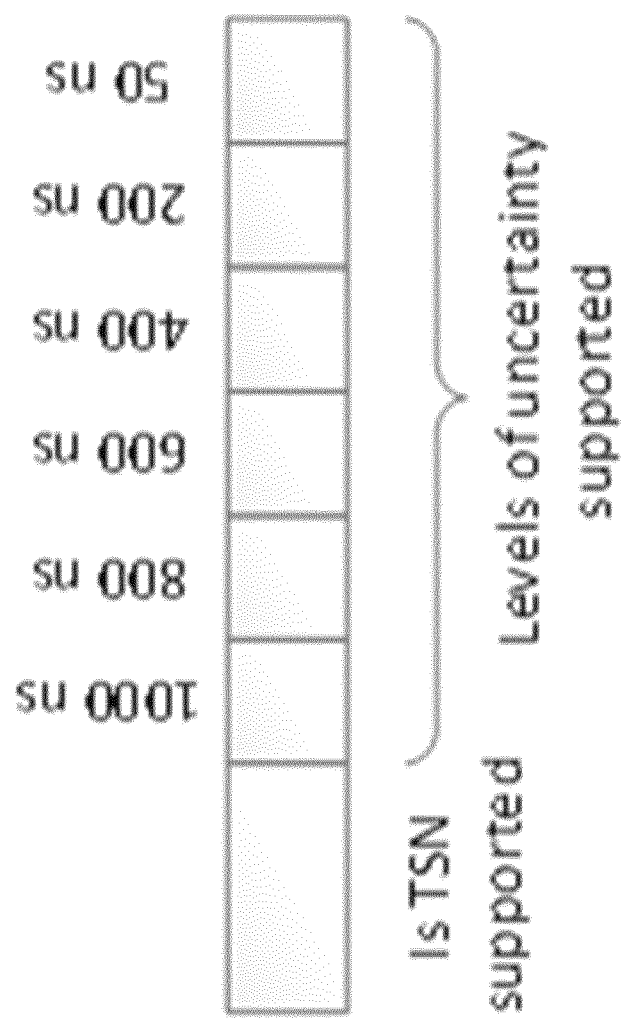
FIG. 4 is an example of a bitmap included in a message for reporting time synchronization capability.

FIG. 4 is an example of a bitmap included in a message for reporting time synchronization capability. In some embodiments, the UE can send the message to indicate the maximum bound of uncertainty (accuracy error) corresponding to all sources of uncertainty introduced when relaying a 5G system clock from the UE antenna to a DS-TT. In some embodiments, the capability information can be provided as a bit map in the message. An example is illustrated in FIG. 5.

Figure 5:
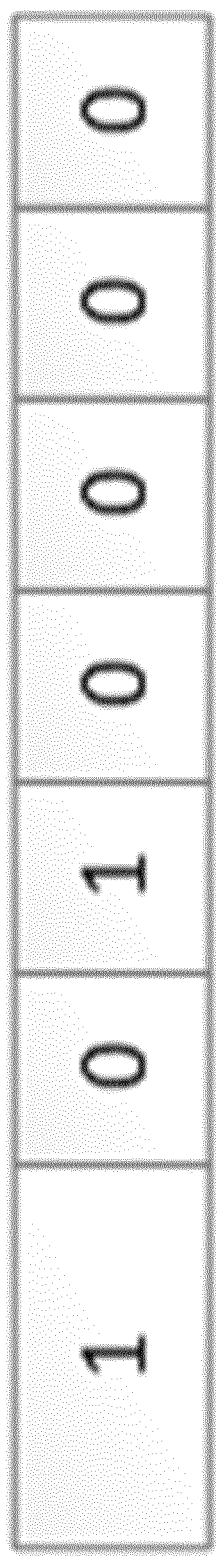
FIG. 5 is an example of a bitmap representing the capabilities in FIG. 4.

FIG. 5 is an example of a bitmap representing the capabilities in FIG. 4. The bitmap indicates that TSN is supported and the level of uncertainty is 800 ns.

Figure 6:
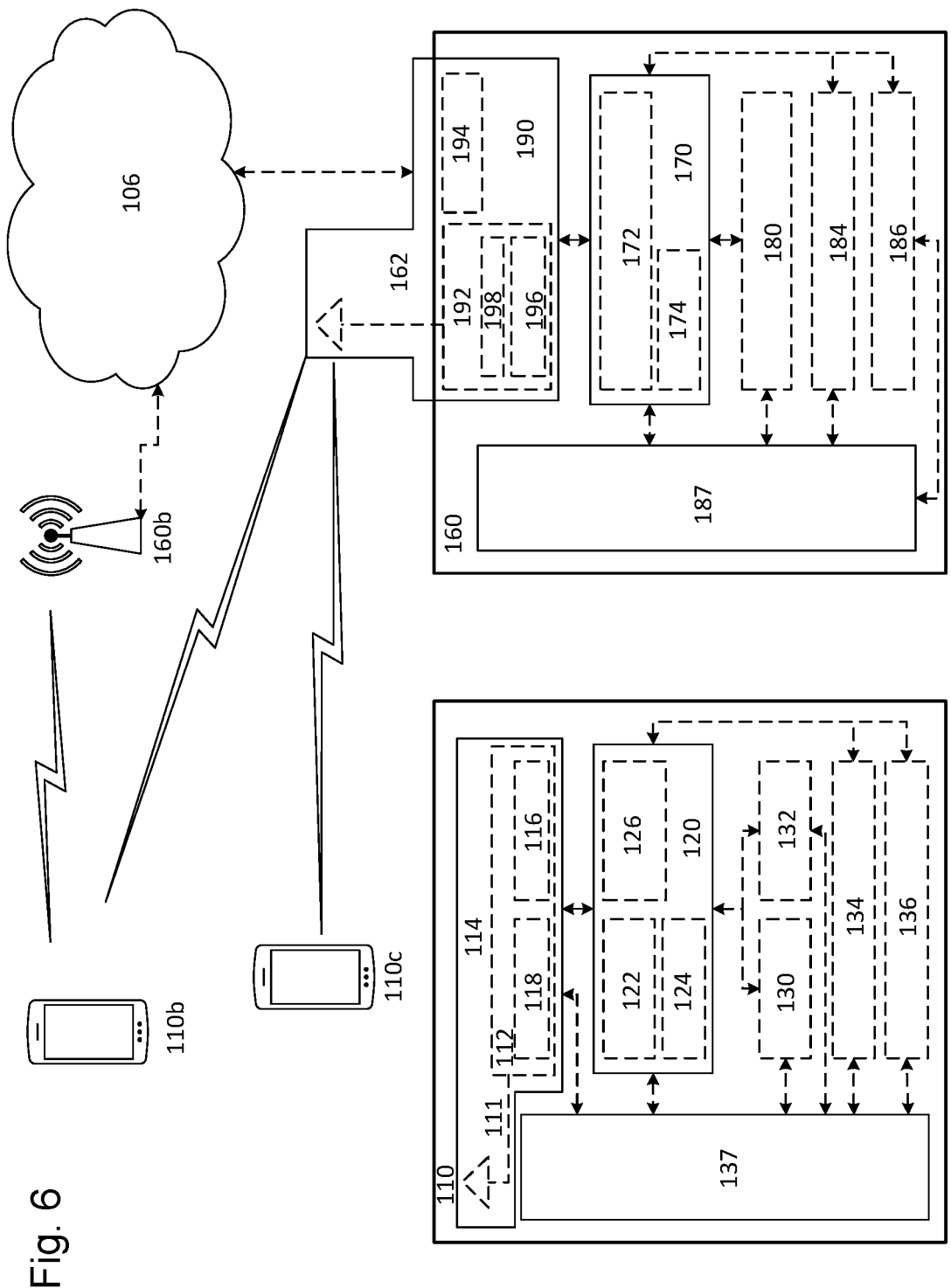
FIG. 6 is a block diagram illustrating an example wireless network.

FIG. 6 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 160 includes processing circuitry 170, device readable medium 180, interface 190, auxiliary equipment 184, power source 186, power circuitry 187, and antenna 162. Although network node 160 illustrated in the example wireless network of FIG. 6 may represent a device that includes the illustrated combination of hardware components, other embodiments may comprise network nodes with different combinations of components.

It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160.

For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 6 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 7:
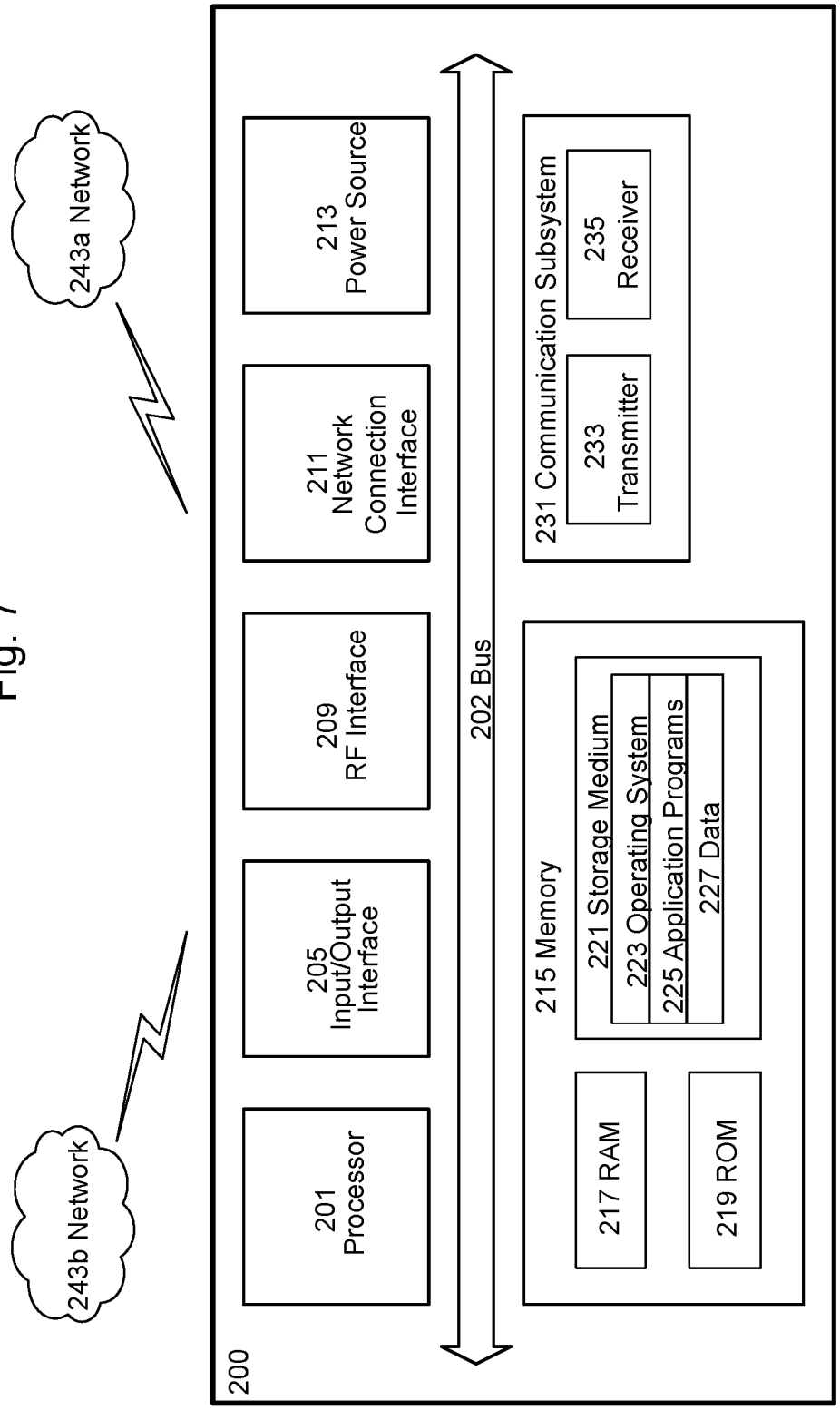
FIG. 7 illustrates an example user equipment, according to certain embodiments.

FIG. 7 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 7, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 7 is a UE, the components discussed herein are equally applicable to a WD, and vice-versa.

In FIG. 7, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may use all the components shown in FIG. 7, or only a subset of the components. The level of integration between the components may vary from one UE to another UE. Further, certain UEs may contain multiple instances of a component, such as multiple processors, memories, transceivers, transmitters, receivers, etc.

In FIG. 7, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof.

UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 7, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 8:
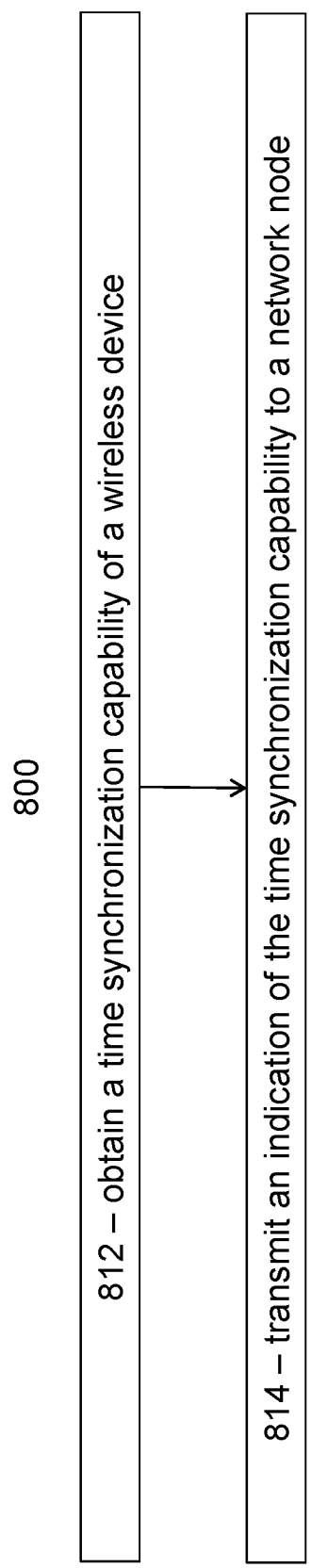
FIG. 8 is flowchart illustrating an example method in a wireless device, according to certain embodiments.

FIG. 8 is a flowchart illustrating an example method in a user equipment, according to certain embodiments. In particular embodiments, one or more steps of FIG. 8 may be performed by wireless device 110 described with respect to FIG. 6. The wireless device is capable of operating in a TSN.

The method begins at step 812, where the wireless device (e.g., wireless device 110) obtaining a time synchronization capability of the wireless device. For example, the wireless device 110 may obtain one or more of a downlink receive tracking accuracy supported by the wireless device (e.g., UE Capability 1 described above), a receive to transmit relative timing accuracy supported by the wireless device (e.g., UE Capability 2 described above), an internal timing accuracy supported by the wireless device (e.g., UE Capability 3 described above), and a PD compensation method selection capability supported by the wireless device (e.g., UE Capability 4 described above). The PD compensation method selection capability may comprise a capability to select between any one or more of a pre-compensation PD based method, a timing advance command based method, and an enhanced RTT based method.

In particular embodiments, the time synchronization capability comprises an indication of whether the wireless device can receive 5G system clock information via one or more of a broadcast (e.g., SIB) and a unicast (e.g., RRC) based method.

In particular embodiments, the time synchronization capability further comprises an indication of a maximum bound of accuracy error associated with a time synchronization capability (e.g., see FIGS. 4 and 5).

At step 814, the wireless device transmits an indication of the time synchronization capability to a network node. For example, wireless device may transmit the obtained time synchronization capability to network node 120.

In particular embodiments, transmitting the indication of the time synchronization capability to the network node comprises transmitting a RRC UE Capability Information message either in response to a request from the network node or periodically.

Modifications, additions, or omissions may be made to method 800 of FIG. 8. Additionally, one or more steps in the method of FIG. 8 may be performed in parallel or in any suitable order.

Figure 9:
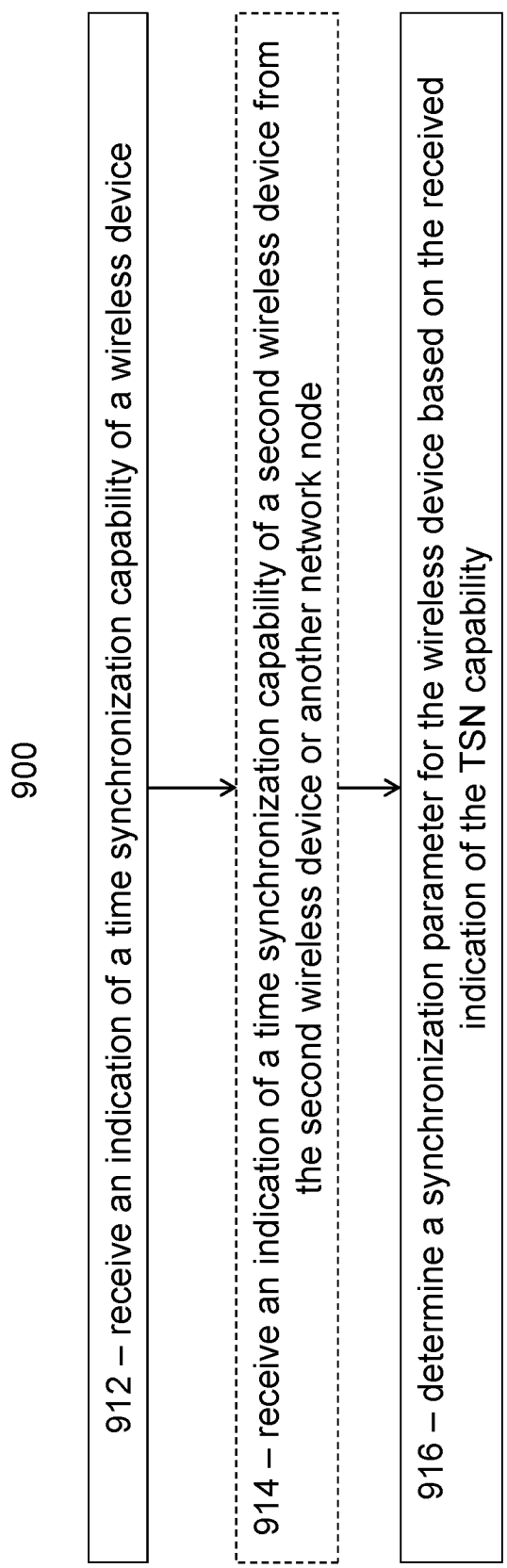
FIG. 9 is a flowchart illustrating an example method in a network node, according to certain embodiments.

FIG. 9 is a flowchart illustrating an example method in a network node, according to certain embodiments. In particular embodiments, one or more steps of FIG. 9 may be performed by network node 160 described with respect to FIG. 6. The network node is capable of operating in a TSN.

The method begins at step 912, where the network node (e.g., network node 160) receives an indication of a time synchronization capability of a wireless device. For example network node 120 may receives any of the time synchronization capabilities described with respect to step 812 of FIG. 8 from wireless device 110.

In some embodiments, a 5G system clock distribution path may include more than one UE (e.g., see FIG. 2). These embodiments may include optional step 814, where the network node receives an indication of a time synchronization capability of a second wireless device from the second wireless device or another network node.

At step 914, the network node determines a synchronization parameter for the wireless device based on the received indication of the time synchronization capability. In some embodiments, the network node may combine time synchronization capabilities from two or more wireless devices.

For example, network node may estimate the 5G system clock accuracy that can be realized for a specific UE and thereby help estimate, with different methods used, whether a given UE can support the end-to end accuracy (uncertainty) requirements for any given TSN GM clock distribution (i.e., uncertainty contributions from network elements external to a 5GS system need to be added to the uncertainty injected by the 5GS to thereby identify a total end-to-end uncertainty that can be realized; 3GPP TS 22.104 specifies and defines 5GS budgets towards different use cases as a fraction of end-to-end requirements).

The network node may determine the most appropriate method for determining a value for downlink PD to be used for compensating a 5G system clock. The network node may determine the most appropriate method for distributing 5G system clock information, such as SIB broadcast or RRC unicast, where the latter includes an improved UE 5G system downlink receive tracking capability.

The network node may determine the synchronization parameter for the wireless device according to any of the embodiments and examples described herein.

Modifications, additions, or omissions may be made to method 900 of FIG. 9. Additionally, one or more steps in the method of FIG. 9 may be performed in parallel or in any suitable order.

Figure 10:
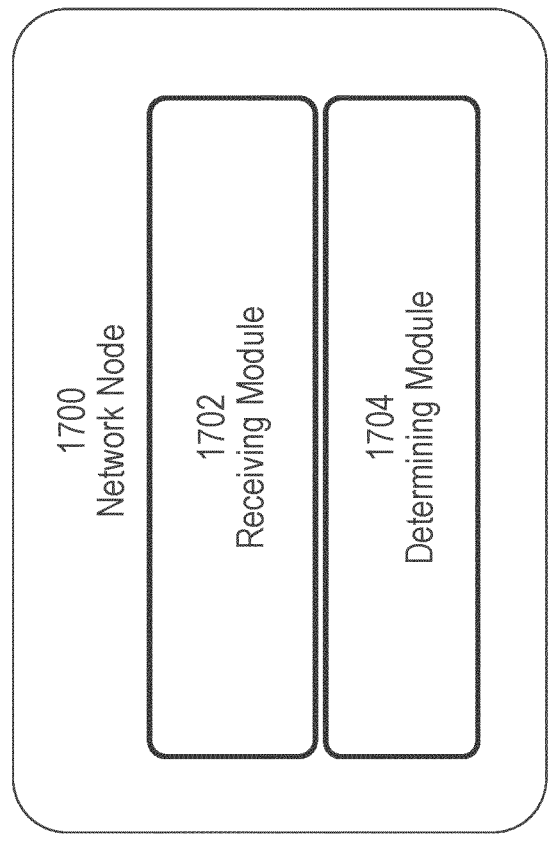
FIG. 10 illustrates a schematic block diagram of a wireless device and network node in a wireless network, according to certain embodiments.
Figure 10:
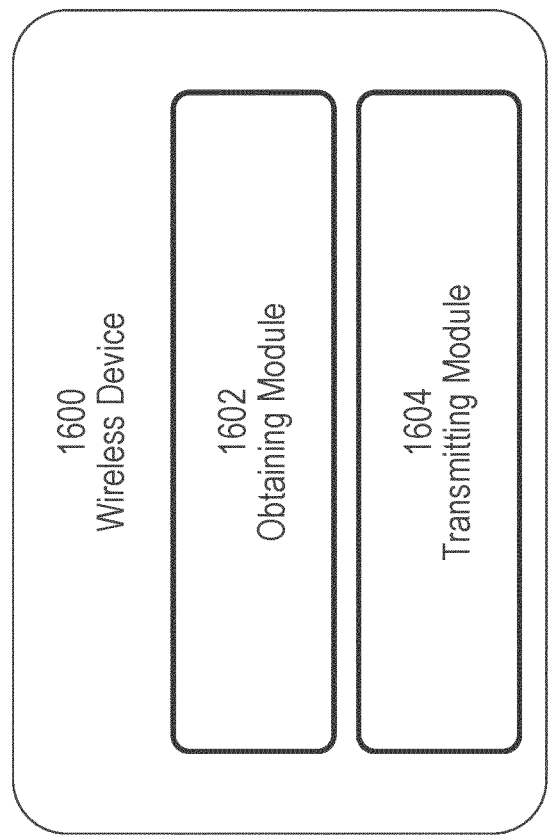

FIG. 10 illustrates a schematic block diagram of two apparatuses in a wireless network (for example, the wireless network illustrated in FIG. 6). The apparatuses include a wireless device and a network node (e.g., wireless device 110 and network node 160 illustrated in FIG. 6). Apparatuses 1600 and 1700 are operable to carry out the example methods described with reference to FIGS. 8 and 9, respectively, and possibly any other processes or methods disclosed herein. It is also to be understood that the methods of FIGS. 8 and 9 are not necessarily carried out solely by apparatus 1600 and/or apparatus 1700. At least some operations of the method can be performed by one or more other entities.

Virtual apparatuses 1600 and 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

In some implementations, the processing circuitry may be used to cause obtaining module 1602, transmitting module 1604, and any other suitable units of apparatus 1600 to perform corresponding functions according one or more embodiments of the present disclosure. Similarly, the processing circuitry described above may be used to cause receiving module 1702, determining module 1704, transmitting module 1706, and any other suitable units of apparatus 1700 to perform corresponding functions according one or more embodiments of the present disclosure.

As illustrated in FIG. 10, apparatus 1600 includes obtaining module 1602 configured to obtain time synchronization capabilities for a wireless device, according to any of the embodiments and examples described herein. Apparatus 1600 also includes transmitting module 1604 configured to transmit an indication of UE time synchronization capabilities to a network node, according to any of the embodiments and examples described herein.

As illustrated in FIG. 10, apparatus 1700 includes receiving module 1702 configured to receive time synchronization capability information from a wireless device, according to any of the embodiments and examples described herein. Apparatus 1700 also includes determining module 1704 configured to determine a synchronization parameter for the wireless device, according to any of the embodiments and examples described herein. The synchronization parameter indicates a maximum amount uncertainty introduced when conveying a 5G system clock from a network node to a wireless device and updating the 5G system clock to reflect the downlink propagation delay. Depending on the value of the synchronization parameter, some wireless devices may not be able to support TSN clocks requiring a demanding level of synchronization accuracy.

Figure 11:
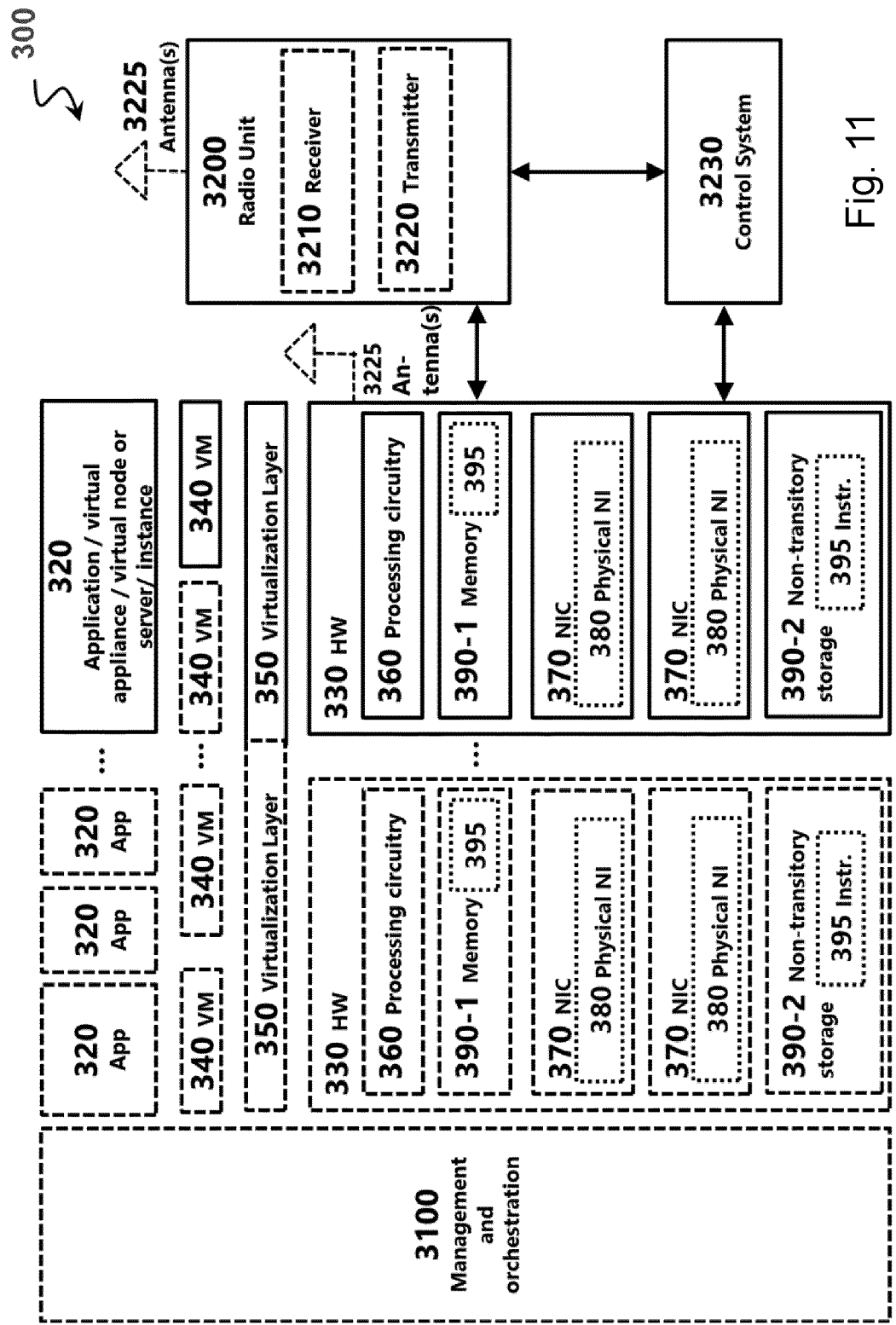
FIG. 11 illustrates an example virtualization environment, according to certain embodiments.

FIG. 11 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 11, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 18.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

Figure 12:
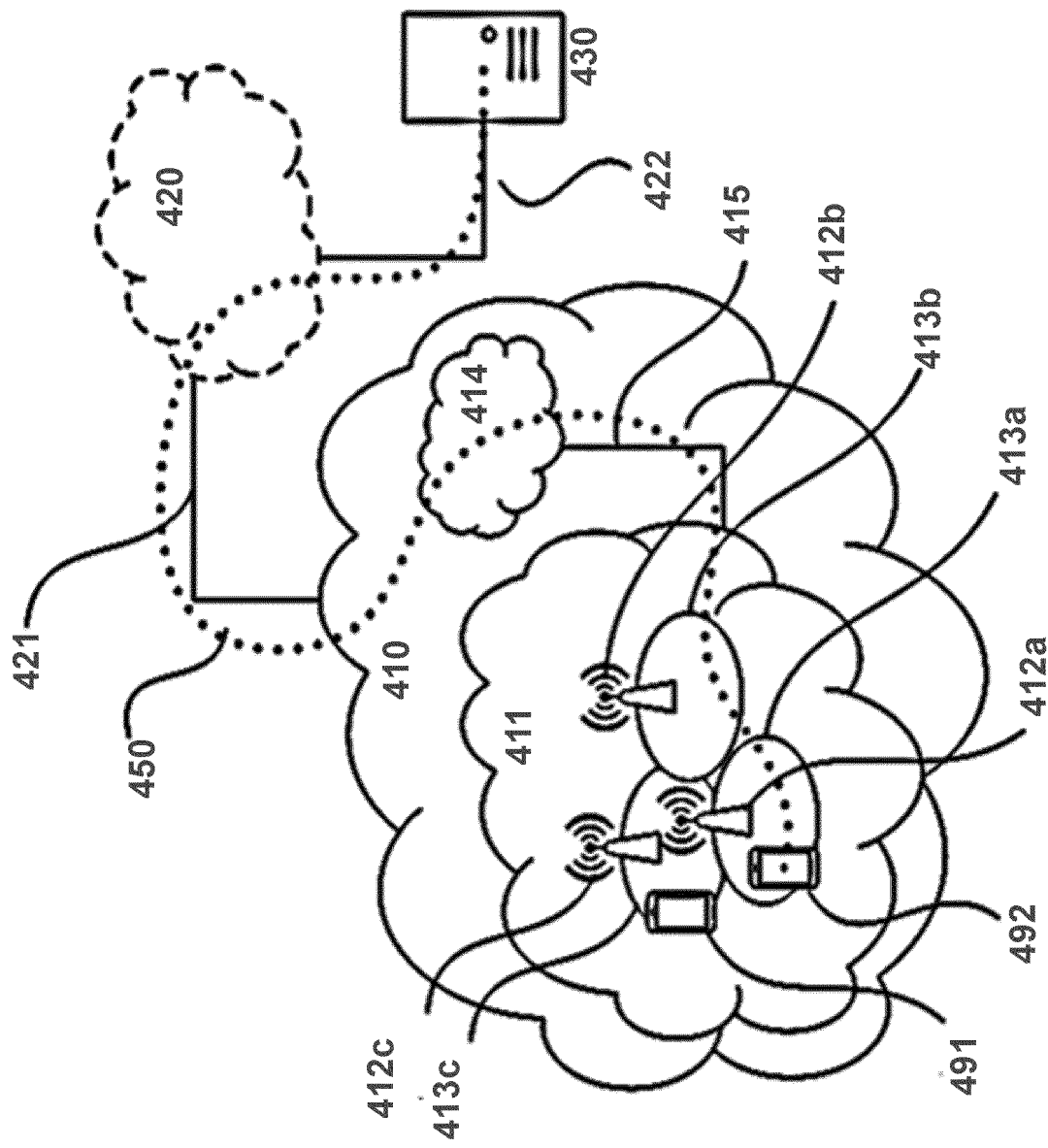
FIG. 12 illustrates an example telecommunication network connected via an intermediate network to a host computer, according to certain embodiments.

With reference to FIG. 12, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 12 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 13:
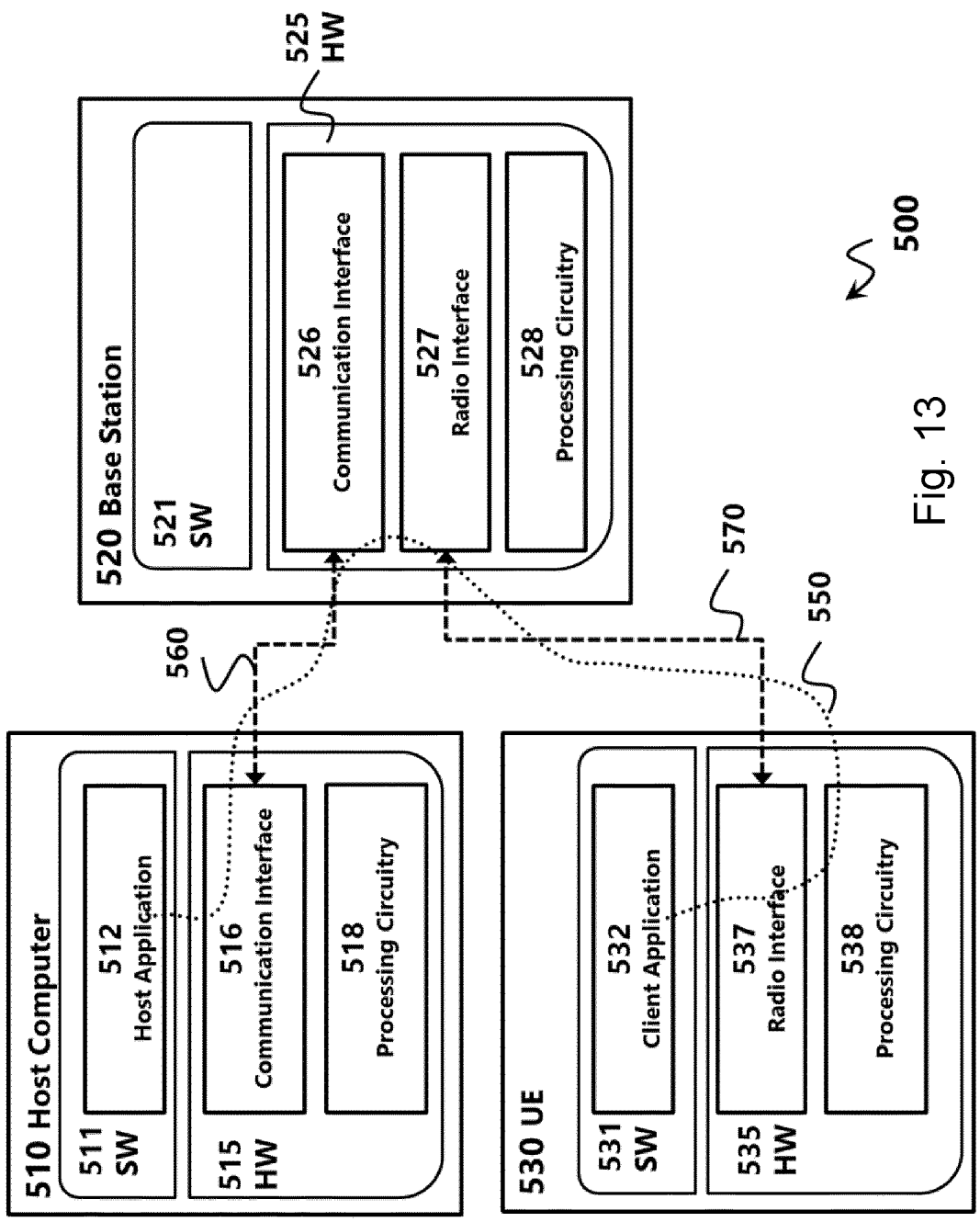
FIG. 13 illustrates an example host computer communicating via a base station with a user equipment over a partially wireless connection, according to certain embodiments.

FIG. 13 illustrates an example host computer communicating via a base station with a user equipment over a partially wireless connection, according to certain embodiments. Example implementations, in accordance with an embodiment of the UE, base station and host computer discussed in the preceding paragraphs will now be described with reference to FIG. 13. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 13) served by base station 520. Communication interface 526 may be configured to facilitate connection 560 to host computer 510. Connection 560 may be direct, or it may pass through a core network (not shown in FIG. 13) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 13 may be similar or identical to host computer 430, one of base stations 412a, 412b, 412c and one of UEs 491, 492 of FIG. 6, respectively. This is to say, the inner workings of these entities may be as shown in FIG. 13 and independently, the surrounding network topology may be that of FIG. 6.

In FIG. 13, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., based on load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, and thereby provide benefits such as reduced user waiting time, better responsiveness and extended battery life.

A measurement procedure may be provided for monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 14:
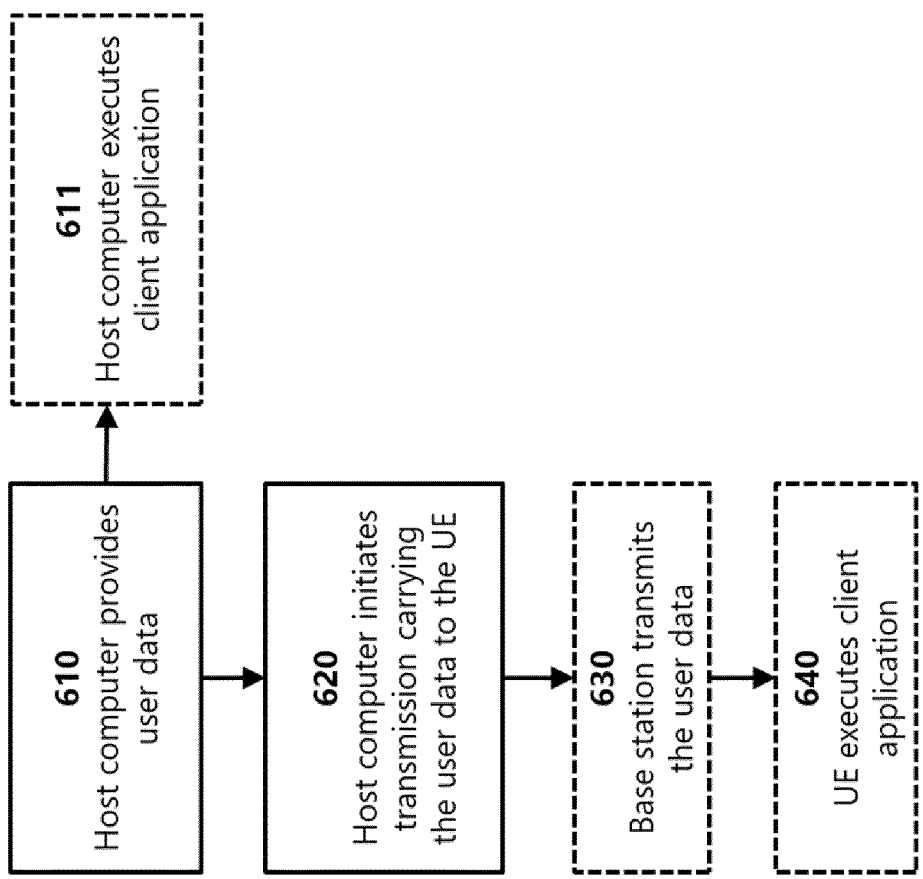
FIG. 14 is a flowchart illustrating a method implemented, according to certain embodiments.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section.

In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 15:
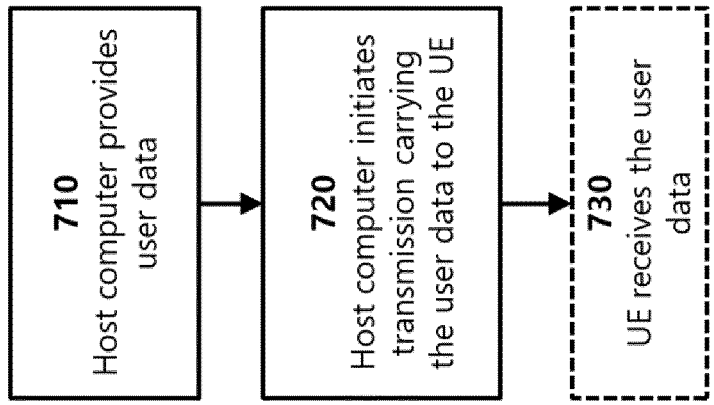
FIG. 15 is a flowchart illustrating a method implemented in a communication system, according to certain embodiments.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section.

In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 16:
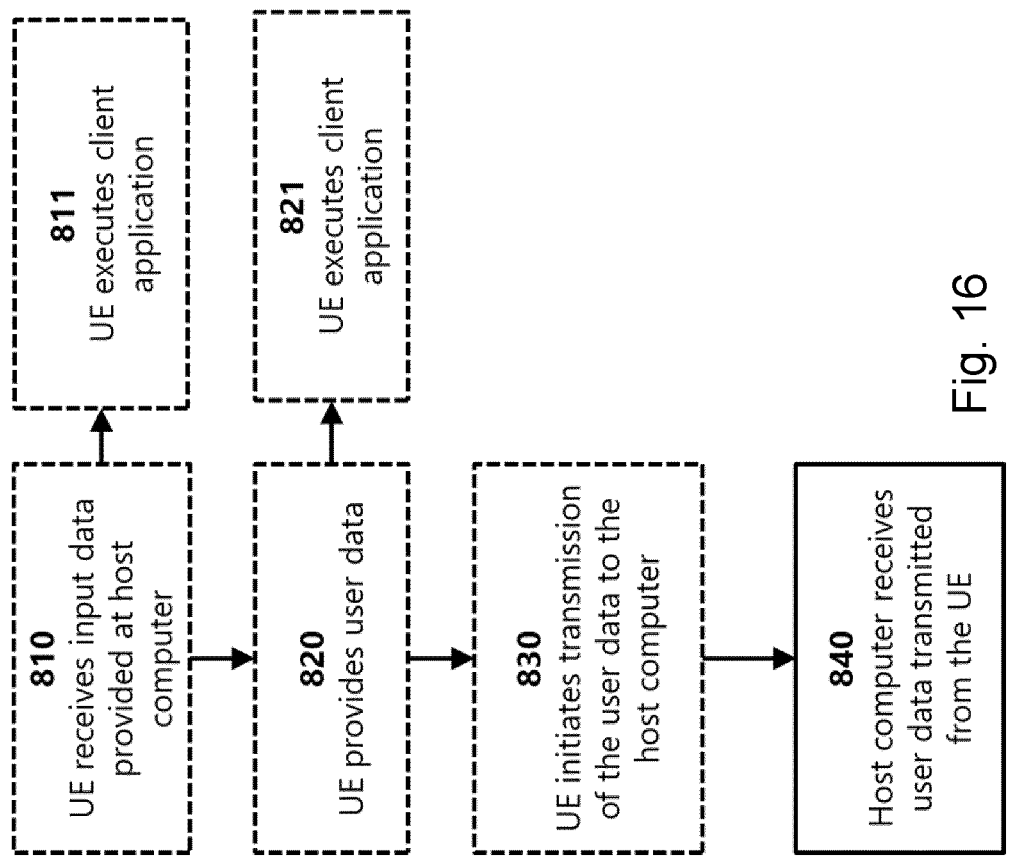
FIG. 16 is a flowchart illustrating a method implemented in a communication system, according to certain embodiments.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section.

In step 810 (which may be optional), the UE receives input data provided by the host computer. Additionally, or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 17:
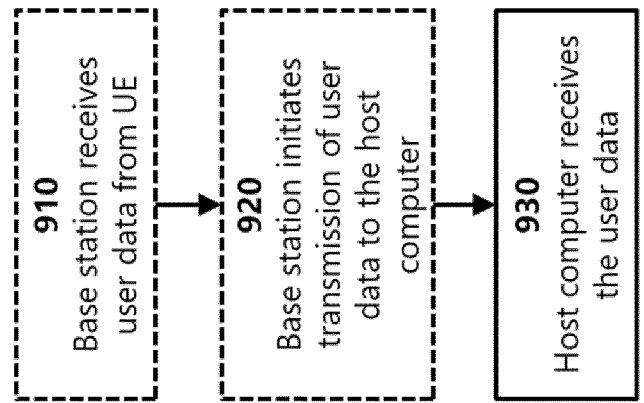
FIG. 17 is a flowchart illustrating a method implemented in a communication system, according to certain embodiments.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section.

In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

At least some of the following abbreviations may be used in this disclosure. If there is an inconsistency between abbreviations, preference should be given to how it is used above. If listed multiple times below, the first listing should be preferred over any subsequent listing(s).

1xRTT CDMA2000 1x Radio Transmission Technology
3GPP 3rd Generation Partnership Project
5G 5th Generation
5GS 5G System
ABS Almost Blank Subframe
ARQ Automatic Repeat Request
AWGN Additive White Gaussian Noise
BCCH Broadcast Control Channel
BCH Broadcast Channel
BW Bandwidth
CA Carrier Aggregation
CC Carrier Component
CCCH SDU Common Control Channel SDU
CDMA Code Division Multiplexing Access
CE Control Element
CGI Cell Global Identifier
CIR Channel Impulse Response
CNC Central Network Controller (for TSN)
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
D2D Device-To-Device
DCCH Dedicated Control Channel
DL Downlink
DM Demodulation
DMRS Demodulation Reference Signal
DRX Discontinuous Reception
DS-TT Device Side TSN Translator
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
GM Grand Master
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
IIoT Industrial Internet-of-Things
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
NW-TT Network-side TSN Translator
OCNG OFDMA Channel Noise Generator
OFDM Orthogonal Frequency Division Multiplexing
OFDMA Orthogonal Frequency Division Multiple Access
OSS Operations Support System
OTA Over the Air
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PD Propagation Delay
PDP Profile Delay Profile
PDSCH Physical Downlink Shared Channel PGW Packet Gateway
PHICH Physical Hybrid-ARQ Indicator Channel
PLMN Public Land Mobile Network
PMI Precoder Matrix Indicator
ppb parts per billion
PRACH Physical Random Access Channel
PRS Positioning Reference Signal
PSS Primary Synchronization Signal
PTP Precision Time Protocol
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RAR Random Access Response
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
RTT Round Trip Time
SCH Synchronization Channel
SCell Secondary Cell
SCS Subcarrier Spacing
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TA Timing Advance
TDD Time Division Duplex
TDOA Time Difference of Arrival
TOA Time of Arrival
TS Time Synchronization
TSN Time Sensitive Networking
TSS Tertiary Synchronization Signal
TTI Transmission Time Interval
UE User Equipment
UL Uplink
UMTS Universal Mobile Telecommunication System
UPF User Plane Function
URLLC Ultra-Reliable Low-Latency Communications
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device capable of operating in a time sensitive network (TSN), the method comprising:
   obtaining a time synchronization capability of the wireless device;
   transmitting an indication of the time synchronization capability to a network node;
   wherein the time synchronization capability comprises at least one of:
      an internal timing accuracy of relaying time information between an antenna of the wireless device and a device-side TSN translator (DS-TT) of the wireless device;
      a receive to transmit relative timing accuracy supported by the wireless device related to performing a round-trip time (RTT) based propagation delay (PD) compensation method;
   and
      a PD compensation method selection capability supported by the wireless device, wherein the PD compensation method selection capability comprises a capability to select between a pre-compensation PD based method, a timing advance command based method, and an enhanced RTT based method.

2. The method of claim 1, wherein the time synchronization capability comprises at least one of:
   an indication of whether the wireless device can receive fifth generation (5G) system clock information via one or more of a broadcast and a unicast based method; and
   an indication of a maximum bound of accuracy error associated with a time synchronization capability.

3. The method of claim 1, wherein transmitting the indication of the time synchronization capability to the network node comprises transmitting a radio resource control (RRC) UE Capability Information message in response to a request from the network node.

4. The method of claim 1, wherein transmitting the indication of the time synchronization capability to the network node comprises periodically transmitting a radio resource control (RRC) UE Capability Information message to the network node.

5. A wireless device capable of operating in a time sensitive network (TSN), the wireless device comprising processing circuitry operable to:
   obtain a time synchronization capability of the wireless device;
   transmit an indication of the time synchronization capability to a network node;
   wherein the time synchronization capability comprises at least one of:
      an internal timing accuracy of relaying time information between an antenna of the wireless device and a device-side TSN translator (DS-TT) of the wireless device;
      a receive to transmit relative timing accuracy supported by the wireless device related to performing a round-trip time (RTT) based propagation delay (PD) compensation method; and
      a PD compensation method selection capability supported by the wireless device, wherein the PD compensation method selection capability comprises a capability to select between a pre-compensation PD based method, a timing advance command based method, and an enhanced RTT based method.

6. The wireless device of claim 5, wherein transmitting the indication of the time synchronization capability to the network node comprises transmitting a radio resource control (RRC) UE Capability Information message in response to a request from the network node, or, wherein transmitting the indication of the time synchronization capability to the network node comprises periodically transmitting a radio resource control (RRC) UE Capability Information message to the network node.

7. A method performed by a network node capable of operating in a time sensitive network (TSN), the method comprising:
   receiving an indication of a time synchronization capability of a wireless device;
   determining a synchronization parameter for the wireless device based on the received indication of the time synchronization capability;
   wherein the time synchronization capability comprises at least one of:
      an internal timing accuracy of relaying time information between an antenna of the wireless device and a device-side TSN translator (DS-TT) of the wireless device;
      a receive to transmit relative timing accuracy supported by the wireless device related to performing a round-trip time (RTT) based propagation delay (PD) compensation method;
      a PD compensation method selection capability supported by the wireless device, wherein the PD compensation method selection capability comprises a capability to select between a pre-compensation PD based method, a timing advance command based method, and an enhanced RTT based method.

8. The method of claim 7, wherein determining the synchronization parameter comprises at least one of:
   determining a PD compensation method to use based on the received synchronization capability; and
   determining a PD compensation method is not needed.

9. The method of claim 7, wherein the time synchronization capability comprises at least one of:
   an indication of whether the wireless device can receive fifth generation (5G) system clock information via one or more of a broadcast and a unicast based method; and,
   an indication of a maximum bound of accuracy error associated with a time synchronization capability.

10. The method of claim 7, wherein determining the synchronization parameter for the wireless device is based on a number of wireless devices in a fifth generation (5G) system clock distribution path; or, further comprising receiving an indication of a time synchronization capability of a second wireless device from the second wireless device or another network node.

11. A network node capable of operating in a time sensitive network (TSN), the network node comprising processing circuitry operable to:
   receive an indication of a synchronization capability of a wireless device;
   determine a synchronization parameter for the wireless device based on the received indication of the time synchronization capability;
   wherein the time synchronization capability comprises at least one of:
      an internal timing accuracy of relaying time information between an antenna of the wireless device and a device-side TSN translator (DS-TT) of the wireless device; and
      a receive to transmit relative timing accuracy supported by the wireless device related to performing a round-trip time (RTT) based propagation delay (PD) compensation method;
      a PD compensation method selection capability supported by the wireless device, wherein the PD compensation method selection capability comprises a capability to select between a pre-compensation PD based method, a timing advance command based method, and an enhanced RTT based method.

12. The network node of claim 11, wherein the processing circuitry is operable to determine the synchronization parameter by determining a PD compensation method to use based on the received synchronization capability; or, wherein the processing circuitry is operable to determine the synchronization parameter by determining a PD compensation method is not needed.

13. The network node of claim 11, wherein the time synchronization capability comprises at least one of:
   an indication of whether the wireless device can receive fifth generation (5G) system clock information via one or more of a broadcast and a unicast based method; and
   an indication of a maximum bound of accuracy error associated with a time synchronization capability.

14. The network node of claim 11, wherein the processing circuitry is operable to determine the synchronization parameter for the wireless device based on a number of wireless devices in a fifth generation (5G) system clock distribution path; or, operable to receive an indication of a time synchronization capability of a second wireless device from the second wireless device or another network node.

* * * * *